May 20, 1958
H. C. WARRINGTON
2,835,370
ARTICLE HANDLING APPARATUS
Filed July 23, 1957
6 Sheets-Sheet 1
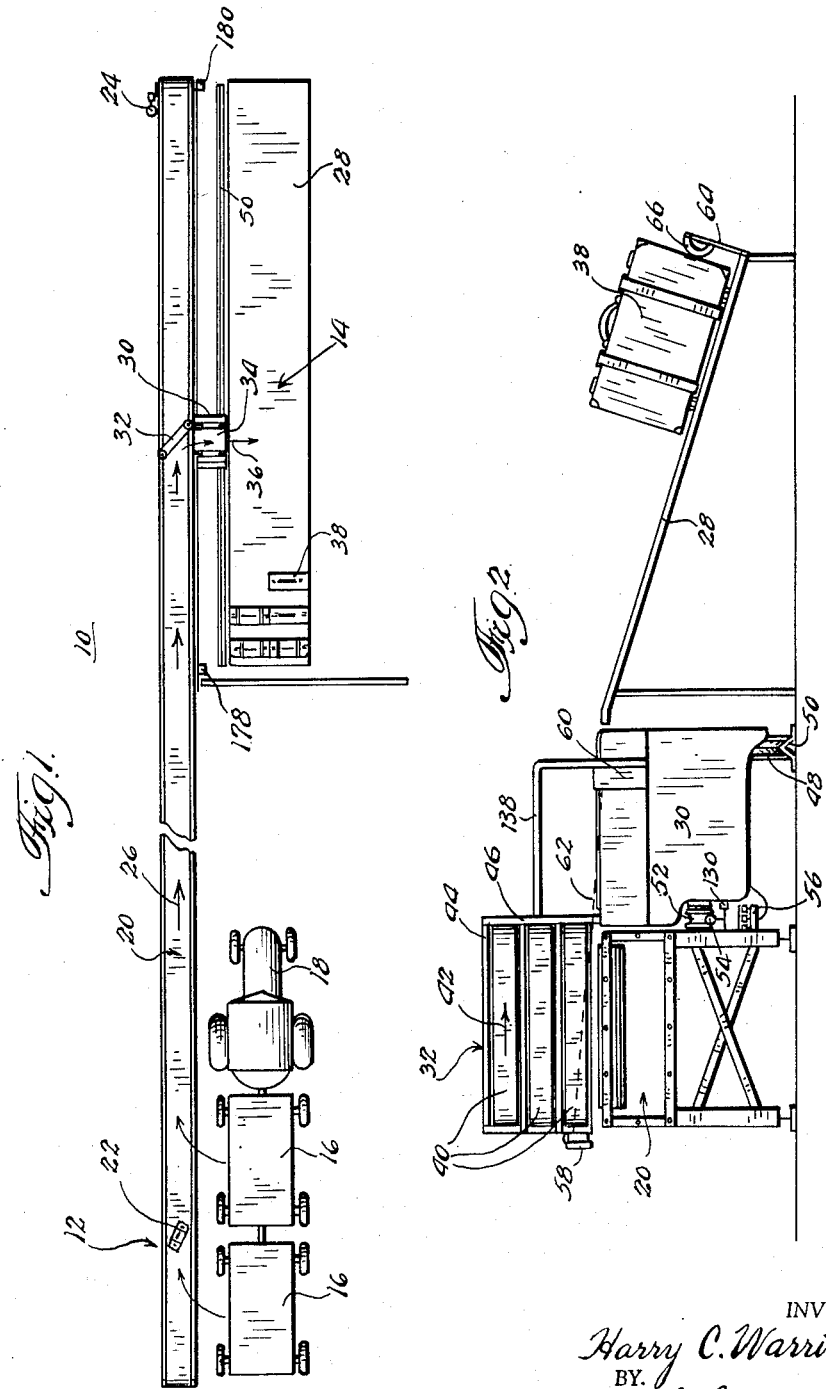
INVENTOR.
Harry C. Warrington
BY
Olsen, Mecklenburger, van Holst,
Pendleton & Neuman

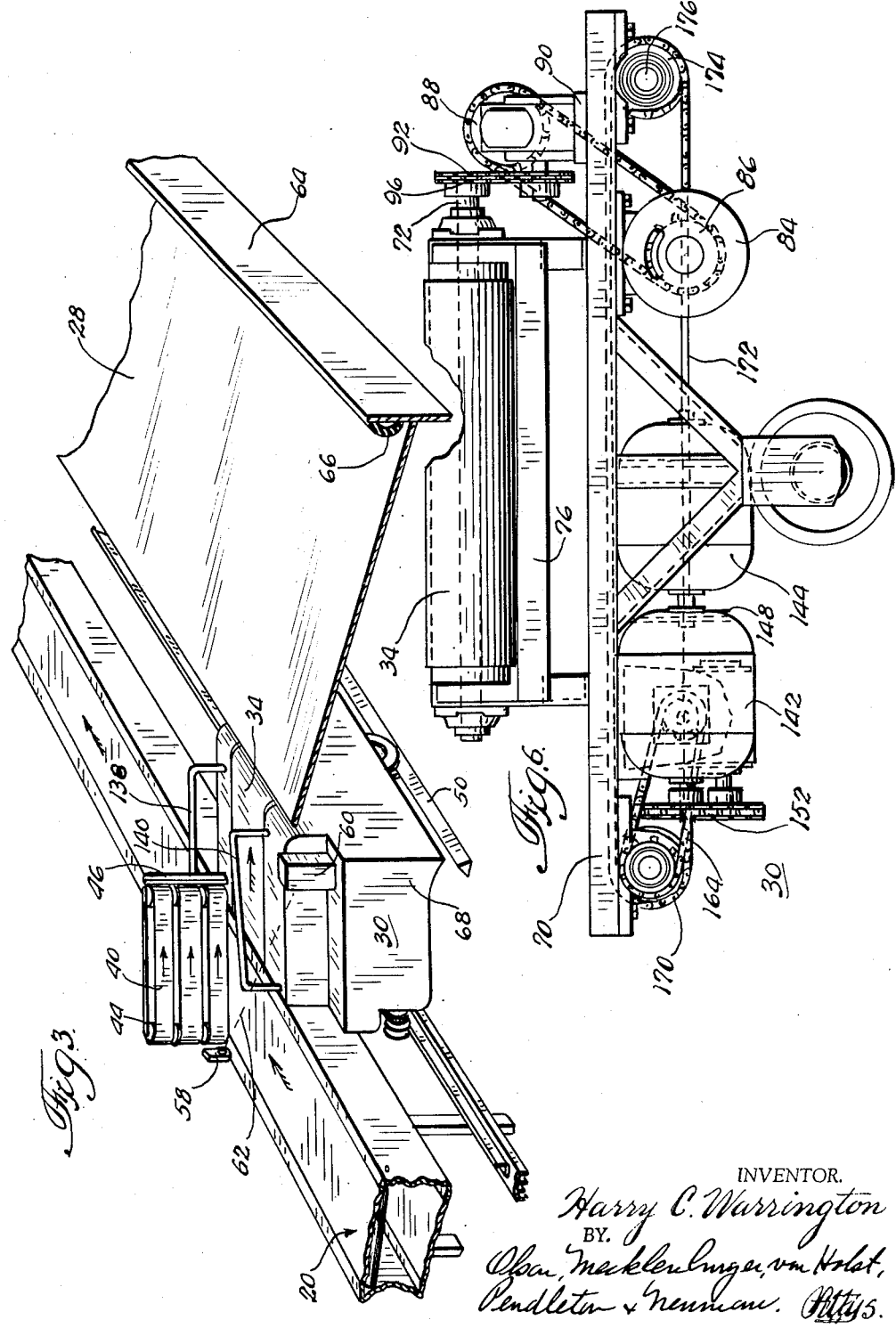

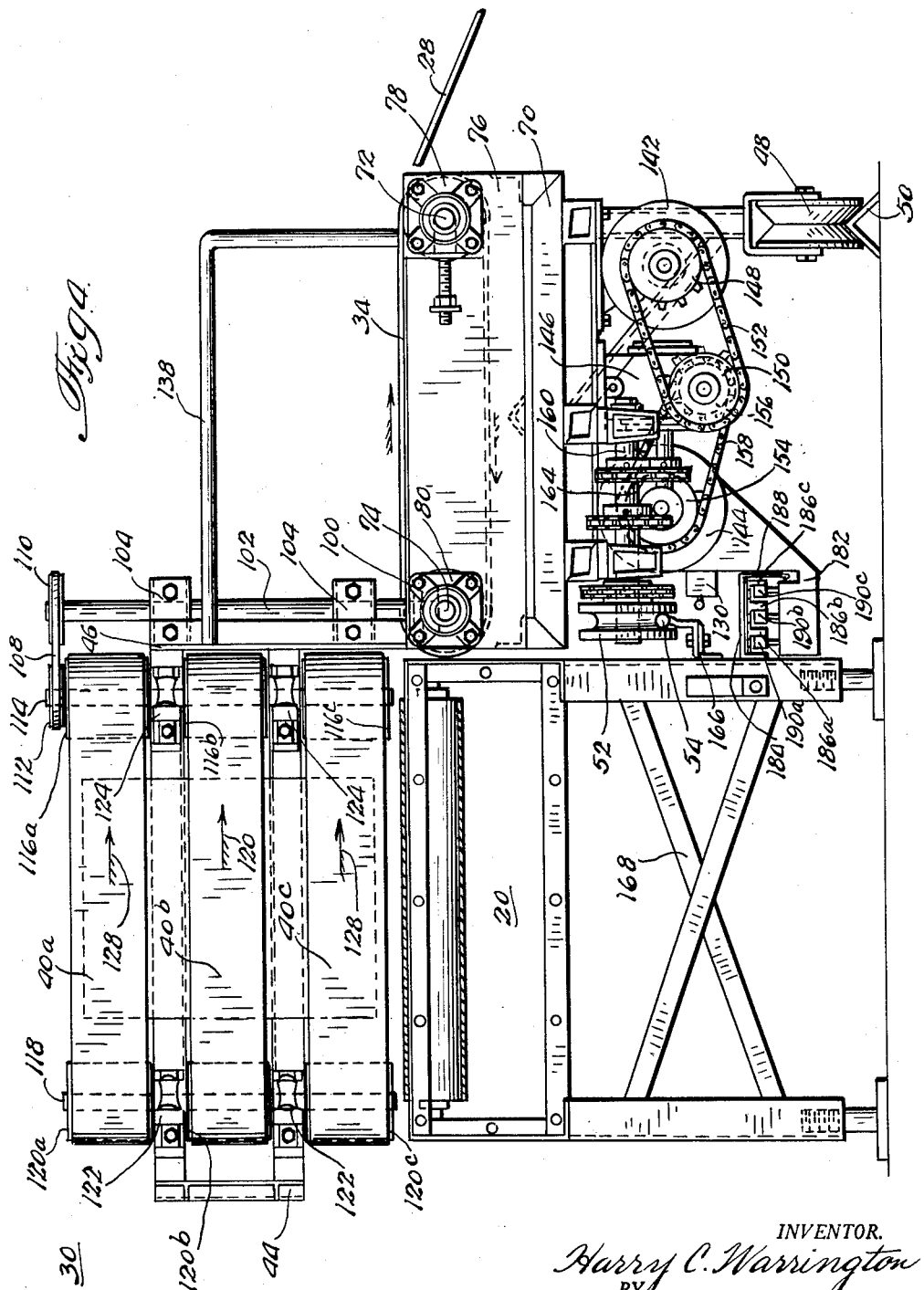

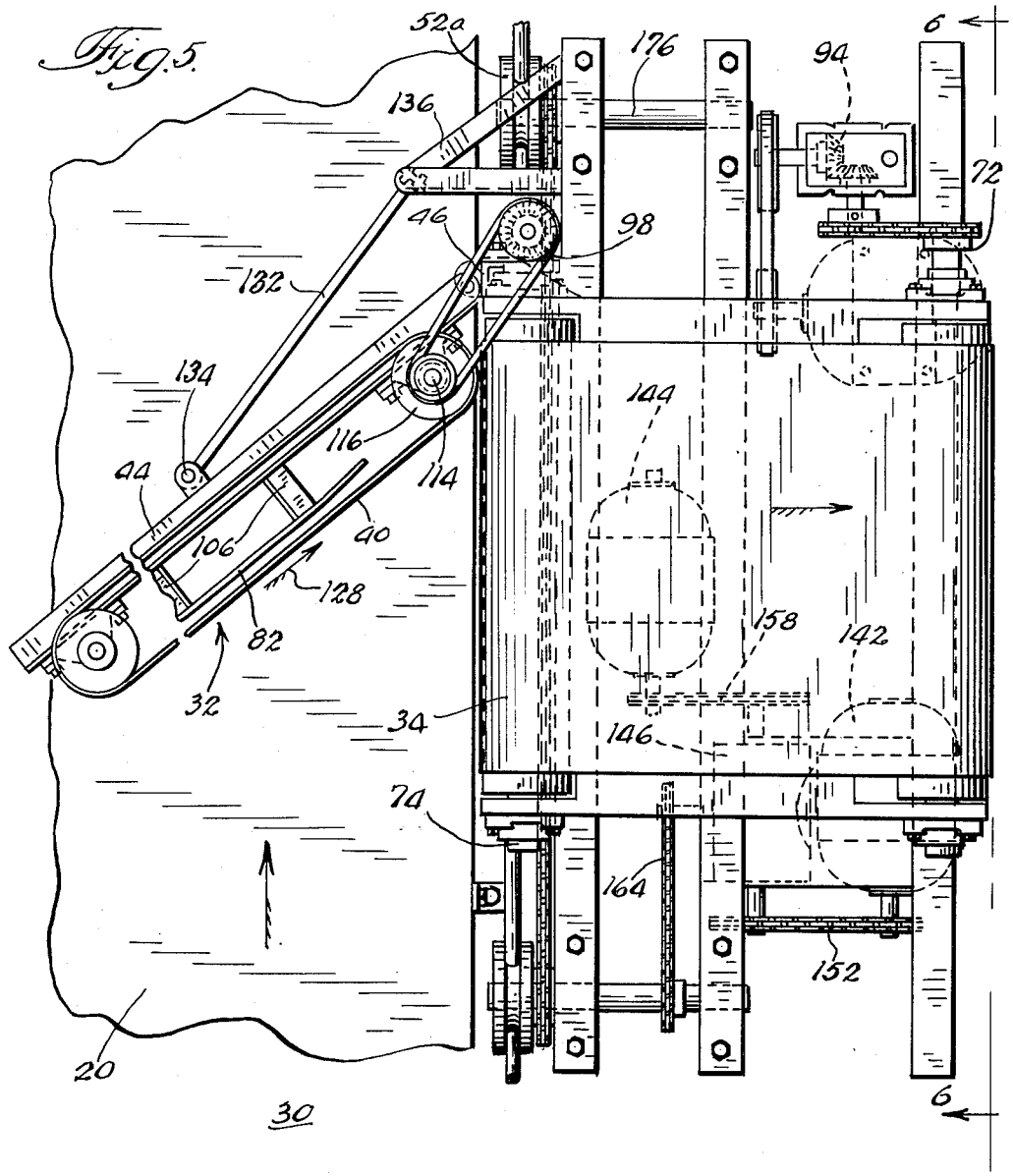

May 20, 1958 H. C. WARRINGTON 2,835,370
ARTICLE HANDLING APPARATUS
Filed July 23, 1957 6 Sheets-Sheet 5
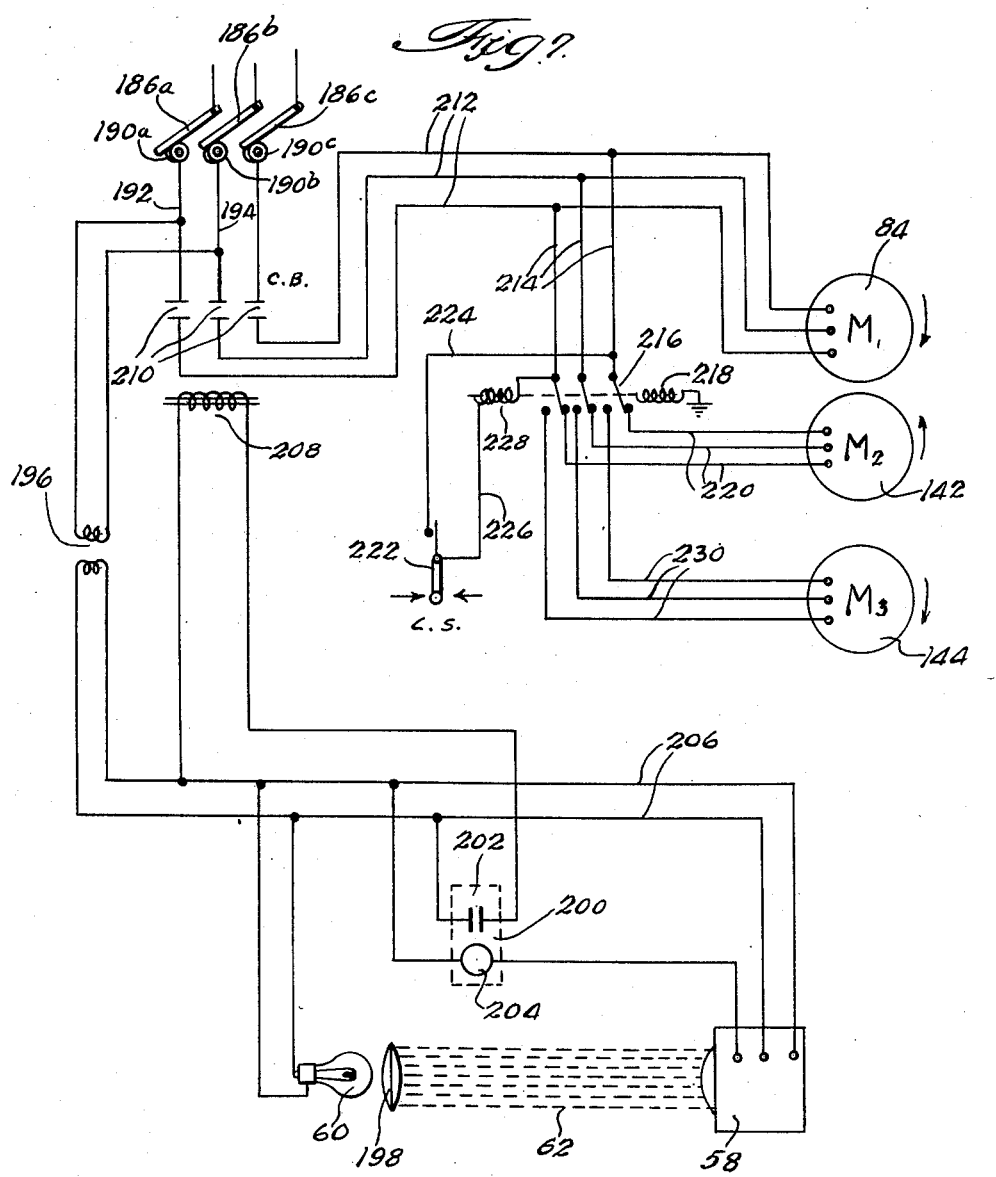
INVENTOR.
Harry C. Warrington.

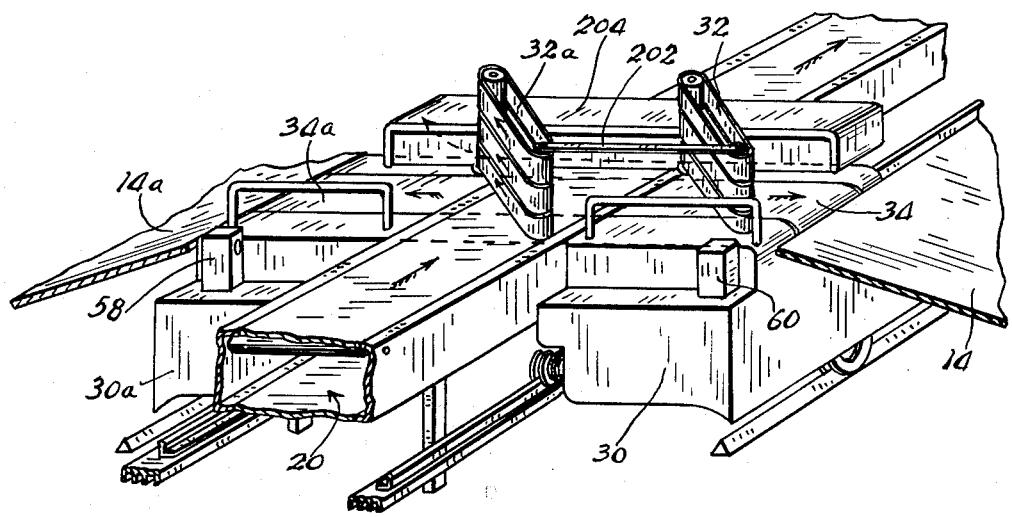
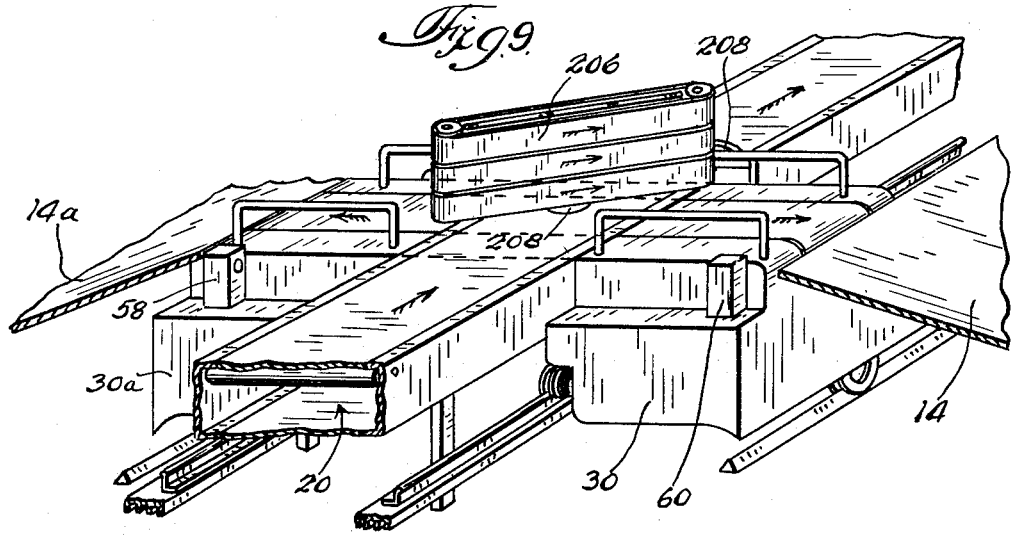

United States Patent Office 2,835,370
Patented May 20, 1958

2,835,370

ARTICLE HANDLING APPARATUS

Harry C. Warrington, Aurora, Colo., assignor to United Air Lines, Inc., Chicago, Ill., a corporation of Delaware Application July 23, 1957, Serial No. 673,628

7 Claims. (Cl. 198—21)

This invention relates to improved article handling apparatus and more particularly, in a preferred embodiment, relates to the expedient handling of baggage for rapid and efficient distribution to passengers.

In all forms of current public transportation one of the major causes of any existing customer irritation and dissatisfaction is the difficulty and delay characteristic of baggage distribution at the termination of travel. This is particularly true in air travel where the travel time between distant points is relatively short and thus any delay imposed upon the passenger at the termination of a flight is especially annoying.

It has been customary heretofore to manually deliver baggage directly to the individual passenger and at that time collect from the passenger his baggage check or other identifying means. Such a system utilizing limited personnel necessarily results in excessive crowding, handling and delay.

It is therefore one important object of this invention to provide improved apparatus for the distribution of articles in spaced relationship along an elongate receiving area.

It is a further object of this invention to provide improved baggage handling apparatus capable of distributing baggage in predetermined spaced relationship along a receiving area.

It is still a further object of this invention to provide baggage distributing means capable of receiving bags at an isolated vehicle unloading area and to quickly and automatically move said bags into a baggage receiving and claiming area and dispose said bags in spaced aligned relationship.

It is still a further object of this invention to transfer baggage by conveyor means from an unloading area to a baggage receiving and claiming area quickly and efficiently, whereby passengers may, without delay, personally claim their individual articles.

It is still another object of this invention to provide baggage distributing means which will receive baggage from an isolated unloading area and quickly and automatically position the individual articles in spaced aligned relationship in such a manner that the baggage may be readily and quickly identified by the owners thereof and expediently retrieved and claimed.

It is still another object of this invention to transport baggage from an isolated unloading area to a receiving area and dispose the baggage in aligned spaced relationship for reclaiming without dropping, jostling, undue mistreatment or damage in handling.

Further and additional objects of this invention will become manifest from this description, the accompanying drawings, and appended claims.

In one form of this invention an elongate continuous conveyor is provided extending between an isolated unloading area and an elongate spaced receiving area. A vehicle is adapted to move longitudinally between the conveyor and receiving area and to transfer baggage from the conveyor to the receiving area. The vehicle includes deflector means and transverse conveyor means to accomplish this purpose and is adapted to intermittently move along the length of said receiving means, each movement being controlled by the arrival of an article of baggage, whereby the bags are distributed in substantially uniform spaced relationship in the receiving area.

While the above described embodiment provides only unilateral transverse deflection, alternate embodiments are provided utilizing opposed sloping receiving surfaces and means capable of bilateral deflection.

For a more complete understanding of this invention reference will now be made to the accompanying drawing wherein:

Fig. 1 is a diagrammatic plan view of the over-all article handling system of this invention;

Fig. 2 is an enlarged diagrammatic end view of the embodiment of Fig. 1;

Fig. 3 is a partial perspective view of the embodiment of Fig. 1;

Fig. 4 is an enlarged detailed end view, partially in section, of the embodiment of Fig. 1;

Fig. 5 is a top plan view of the vehicle portion of the embodiment of Fig. 1;

Fig. 6 is an illustration in side elevation of the vehicle portion of the embodiment of Fig. 1;

Fig. 7 is a schematic circuit diagram of the electrical wiring of the embodiment of Fig. 1;

Fig. 8 illustrates an alternate embodiment of the invention providing bilateral deflection; and Fig. 9 illustrates a second system for bilateral deflection.

Referring now to the drawings and more particularly to Fig. 1, the article handling system 10 of this invention is illustrated for transporting baggage from an unloading area 12 to a receiving means 14. While the unloading area 12 may be in the immediate vicinity of the source of articles, in the particular embodiment described it is contemplated that articles of baggage may be brought to the unloading area 12 on trucks 16 drawn by a tractor 18. Hereinafter, this invention will be described as it is preferably used in conjunction with aircraft transportation and concomitant baggage handling. However, it will be understood that the invention is equally useful wherever articles are to be handled in a similar manner.

The baggage which is brought from the aircraft on trucks 16 is placed on a conveyor belt 20 in the unloading area 12. One bag 22 is diagrammatically shown in position on the conveyor belt 20. The conveyor belt 20 is provided with a conventional drive means 24 which will generally include an electric motor and speed reducing means. The conveyor 20 will move in the direction indicated by arrows 26 to carry the bags into the receiving area.

The receiving area includes a sloping surface 28 which is spaced from the conveyor 20 and extends substantially parallel thereto. The surface 28 slopes downwardly away from the conveyor 20 and an article handling vehicle 30 is disposed therebetween. The vehicle 30 has an angularly disposed baggage deflector 32 and a transverse conveyor 34. Thus, as a bag engages the deflector 32 it is shifted transversely relative to the conveyor 20 onto conveyor 34. Conveyor 34 is adapted to move in the direction indicated by arrow 36 whereby the bag is shifted onto the receiving surface 28 where it will slide to the lowermost edge thereof to the position indicated by bag 38.

Passengers enter the receiving area and identify and claim their individual baggage from receiving means 14. As the passengers are leaving the receiving area they surrender their baggage claim checks to an attendant.

The vehicle 30 is adapted to move longitudinally between the conveyor and the receiving area. The vehicle is self-powered, as will be explained in greater detail hereinafter, and moves only in response to the arrival of an article of baggage in the receiving area. Upon the arrival of an article, the vehicle will move a predetermined distance along the receiving area and stop, whereby the baggage will be laid in spaced side by side relationship.

The details of the conveyor 20, vehicle 30, and receiving surface 28 can be better understood from the illustrations of Figs. 2 and 3. As shown in Fig. 2 the deflector 32 comprises three moving belts 40 adapted to move in the direction indicated by arrow 42. The belts are suspended on bearings mounted in a frame 44 hung as a cantilever from a mast 46. The vehicle 30 has a single wheel 48 which travels in a track 50 and a pair of driving wheels 52 which engage a rail 54 mounted on the conveyor 20. Electric power is supplied for the vehicle 30 through a three-phase feed rail system 56.

Motion of the vehicle 30, transverse conveyor 34 and the deflector belts 40 is controlled by a baggage responsive system including a light sensitive unit 58 and a light source 60. Upon the arrival of a bag adjacent to the vehicle 30, a light beam indicated by broken line 62 is interrupted and, as will be described with respect to Fig. 7, the electric circuits are initiated to provide the necessary vehicle and conveyor movement. A substantially vertical abutment 64 at the lowermost edge of sloping receiving surface 28 is provided with a resilient bumper 66 to avoid damage to baggage deposited thereon.

Referring now to Figs. 4, 5 and 6, the details of the vehicle 30 are more clearly illustrated. The vehicle has an enclosing housing 68 shown in Figs. 1, 2 and 3, but removed for clarity in Figs. 4, 5 and 6. A basic frame 70 of rectangular cross section supports the necessary electrical and mechanical equipment. A pair of parallel rotatable shafts 72 and 74 are mounted in appropriate bearings on a superstructure 76 above frame 70. Rollers 78 and 80 are carried thereon and a continuous conveyor belt 34 extends therebetween. The conveyor belt 34 is driven through a series of chain linkages by a fractional horsepower motor 84. The output shaft of motor 84 carries a spur gear 86 which drives spur gear 88 through chain 90. Spur gear 88, in turn, drives chain 92 through a bevel gear 94. Chain 92, in turn, drives a spur gear 96 which is, in turn, fixed to shaft 72.

As shown in Figs. 4 and 5, the shaft 74 terminates in a bevel gear 98 which meshes with a corresponding bevel gear 100 secured to vertical shaft 102. Shaft 102 is rotatably mounted in a pair of bearings 104 which are secured to the vertical mast 46. At the top of shaft 102 a belt 108 is driven by sheave 110 to, in turn, drive a cooperating sheave 112 mounted on shaft 114. Shaft 114 carries rollers 116 and a similar parallel spaced shaft 118 carries correspondingly mounted rollers 120. The rollers 116a, b and c and 120a, b and c are maintained in spaced relationship by bearing portions 122 and 124 whereby three aligned spaced continuous conveyor belts 40a, 40b and 40c are disposed between corresponding rollers and adapted for movement in the direction indicated by arrows 128.

The bearing portions 122 and 124 are supported in a substantially vertical frame 44 which is maintained at an angle relative to the longitudinal axis of conveyor 20, as most clearly shown in Fig. 5. The angle of the deflector frame 44 is rigidly maintained by a rod 132 extending from a pivot point 134 on the frame 44 to an appropriate bracket 136 secured to the vehicle frame 70. A backing plate 82 is mounted on spacers 106 to reinforce the belts 40 and prevent excessive distortion of the belts when baggage is engaged thereby.

The belts 40a, 40b and 40c are driven through the belt and sheaves described above whenever transverse conveyor 34 is in motoin. Thus, when the diverter 32 and transverse conveyor 34 are in motion, baggage moving longitudinally on conveyor 20 is deflected by belts 40a, 40b and 40c onto conveyor 34 whereby they are deposited on sloping receiver surface 28. Railings 138 and 140 are provided to avoid any possibility that baggage may be violently diverted from the conveyor and fall from the vehicle 30.

Mounted beneath the frame 70 of vehicle 30, in addition to the belt motor 84, are two vehicle drive motors 142 and 144. The motors 142 and 144 are connected to a speed reducing gear box 146 through spur gears and connecting chains. The spur gears 148 and 150 and chain 152 provide a driving connection between motor 142 and gear box 146 while spur gears 154 and 156 and chain 158 provide driving connection between motor 144 and gear box 146. The output of gear box 146 is applied to a driving shaft 160 through spur gears and chain 164. Drive shaft 160 has a driving wheel 52 secured thereto which is in continuous driving engagement with a cylindrical rail 54 rigidly secured through bracket 166 to the frame 168 of conveyor 20.

Also secured to drive shaft 160 is a spur gear 170 which through chain 172 drives a corresponding spur gear 174 secured to second drive shaft 176. Drive shaft 176 is mounted in appropriate bearings and has drive wheel 52a secured thereto. Drive wheel 52a, like drive wheel 52, is in continuous driving engagement with rail 54 whereby energization of either motor 144 or motor 142 will produce motion of vehicle 30 relative to conveyor 20. Depending upon the manner in which three-phase motors 142 and 144 are wired, one of the motors will provide motion of the vehicle in one direction relative to the conveyor 20 and the other will produce reversed motion thereof.

A limit switch 130 is provided on the vehicle 30 for reversing motion thereof by energizing one of the motors 142 or 144 while deenergizing the other. Trip means 178 and 180 are diagrammatically shown in Fig. 1 at each end of the receiving area for engaging the limit switch and producing reverse movement of vehicle 30. The power take-off means 56 comprising roller assembly 182 and rail 184 may be of any conventional type and is shown somewhat diagrammatically. It is only required that three individual busses 186a, 186b and 186c be provided in electrically isolated relationship in the rail support 184. An overhang 188 is preferably provided to avoid the possibility of personnel coming in contact with the electrified busses. The rollers 190a, 190b and 190c are connected to an appropriate cable extending upwardly to a control box and in turn to the various motors and other equipment carried by the vehicle.

For a more complete understanding of the circuitry of this embodiment of the invention reference will now be made to Fig. 7 which is a schematic circuit diagram thereof. Three-phase electric power is applied to busses 186a, 186b and 186c through appropriate incoming cable. The rails are in rolling contact with rollers 190a, 190b and 190c as diagrammatically shown whereby the rollers provide power to the remaining elements of Fig. 7, all of which are carried on the vehicle 30. It is normally contemplated that the system will be provided with 230 volt three-phase power. From two of the three-phase lines 192 and 194 a 230–115 volt step-down transformer 196 is energized. From the output of transformer 196 the light source 60 is energized. The light source 60 is preferably provided with a collimating lens 198 to provide an intense beam for photocell unit 58 whereby the system will respond satisfactorily under daylight conditions. As already discussed above, interruption of the light beam 62 will, through appropriate amplifiers provided in photocell unit 58, energize a timer 200. The power for the photocell unit 58 is provided from the output of transformer 196 through conductors 206. Timer 200 includes contacts 202 and a cycling mechanism 204. Cycling mechanism 204 is preferably a small fractional horsepower motor having cam actuated holding contacts whereby the motor will go through a predetermined cycle. In the alternative, control 204 could be a delay relay or the like.

When the light beam 62 is interrupted and the cycling mechanism 200 set into operation contacts 202 are closed completing a circuit from the output of transformer 196 through contacts 202 and circuit breaker coil 208. Circuit breaker coil 208 is maintained energized for a period of time determined by the cycle of mechanism 204. When energized, relay 208 closes contacts 210 which in turn provide electrical energy in lines 212. Lines 212, in turn, energize the motor 84 which drives the transverse conveyor belt 34 and the diverter belts 40a, 40b and 40c. At the same time, power is tapped from lines 212 by lines 214 and applied to the moving blades of a triple pole double throw switch 216. Switch 216 is normally urged by spring 218 to the position shown in Fig. 7 whereby power from lines 214 is applied through switch 216 to lines 220 and, in turn, to motor 142.

Upon movement of the vehicle to an end of the receiving area the limit switch 222 is actuated to complete a circuit from one line 214 of the three-phase system through a conductor 224, switch 222, a conductor 226 and relay coil 228 to another line 214 of the three-phase system. This circuit energizes coil 228 to actuate switch 216. This opens the motor circuit through conductors 220 and completes an alternate circuit through conductors 230 whereby motor 144 is energized and the vehicle moves in the reverse direction. The limit switch is of the toggle type whereby it remains actuated until physically opened.

The speed of motors 142 and 144, the time delay provided by cycling mechanism 200, and the gear ratios provided in the drive system are coordinated in such a manner that during the time either motor 142 or 144 is energized the vehicle 30 will move longitudinally along the receiving area a sufficient distance to space the baggage therealong as shown best in Fig. 1. Upon movement of the vehicle through such a distance, the timer 200 will deenergize the entire system unless a subsequent article of baggage has arrived to interrupt the light beam 62. In that event the cycling mechanism will commence another cycle of operation and the vehicle will remain in continuous operation. When the vehicle reverses intermittent step-like motion a second course of baggage will be formed as shown in Fig. 1 in the event the first course of baggage has not been removed by passengers.

In the alternative, when a substantial volume of articles must be handled, it may be desirable to employ an alternate deflection system such as those illustrated in Figs. 8 and 9. Thereby the stacking of additional courses of baggage may be avoided or still greater volume may be handled.

As shown in Fig. 8, the single conveyor 20 having a moving belt operates in conjunction with two oppositely disposed sloping receiving means 14 and 14a. A vehicle 30 with transverse conveyor 34 and deflector 32 as already described in detail above is provided for cooperation with receiving means 14. A second vehicle 30a which is a mirror-image reproduction of vehicle 30 cooperates with receiving means 14a to deflect baggage from conveyor belt 34 onto receiving means 14a. Vehicle 30a is provided with transverse conveyor 34a and deflector 32a.

While in the embodiment already described in detail, the deflector 32 was rigidly mounted at a predetermined angle, the deflectors 32 and 32a of this embodiment are pivotally mounted on their respective masts and connected for coordinated movement by link 202. The vehicles 30 and 30a are rigidly connected together by a bridging member 204.

The deflectors, as illustrated, would deposit baggage onto receiving means 14a, but by pivotal movement, deflector 32 becomes operative to deposit baggage onto receiving means 14. Shifting of the deflectors may be controlled either manually or automatically, in accordance with a particular operational environment. For example, it may be desirable to deposit all of the baggage from a given flight on one receiving means 14, after which the deflectors would be reversed. In the alternative, the deflectors might be automatically reversed by mechanism within the vehicles 30 upon the completion of each course and this may be accomplished by the limit switches already described. If desired, clearance may be provided between conveyor 20 and the bottom of bridge 204 whereby the deflectors may be positioned in alignment with the axis of conveyor 20, thus permitting baggage to pass the deflectors and proceed along the conveyor.

The embodiment of Fig. 9 illustrates a single deflector 206 for use with one conveyor 20 and two vehicles 30 and 30a. The operation is similar to the bilateral operation just described but is accomplished with a single centrally mounted deflector. The deflector 206 is mounted on a transverse bridge 208 whereby the vehicles 30 and 30a move together and are adapted to selectively receive baggage from deflector 206.

While one particular embodiment of this invention has been described in great detail and two alternate constructions illustrated and described, it will be clear that one skilled in this art will immediately recognize many other uses for this invention and many modifications of the teaching herein without departing from the spirit and scope of this invention. For example, contact means may be substituted for photoelectric beams to determine the presence of an article of baggage adjacent the vehicle 30. Also while a particular sloping receiving area and conveyor belt are illustrated other types of receiving means and article contacting means will immediately occur to one skilled in this art.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. Article distributing means comprising an elongate pathway, an elongate receiving means in parallel spaced relationship with at least a portion of said pathway, drive means for moving articles along said pathway, and diverter means intermediate said pathway and said receiver means and movable longitudinally therebetween for diverting articles from said pathway onto said receiving means at predetermined, spaced intervals along the length of said receiving means, said diverter means comprising an angularly disposed diverter extending transversely over said pathway, a transverse carrier extending between said pathway and said receiving means, drive means for said diverter means, and control means on said diverter means for actuating said drive means and intermittently moving said diverter means parallel to said receiving means in response to the passage of articles whereby said articles are placed in longitudinally spaced relationship on said receiving means, said control means including starter means sensitive to the arrival of an article adjacent said transverse carrier to actuate said drive means and timer means responsive to said starter means to deactuate said drive means.

2. Article distributing means comprising an elongate pathway, an elongate receiving means in parallel spaced relationship with at least a portion of said pathway, drive means for moving articles along said pathway, and diverter means intermediate said pathway and said receiver means and movable longitudinally therebetween for diverting articles from said pathway onto said receiving means at predetermined, spaced intervals along the length of said receiving means, said diverter means comprising a wheeled vehicle disposed between said pathway and said receiving means and adapted for movement substantially parallel thereto, a transverse article carrier disposed on said vehicle and adapted to carry articles between said pathway and said receiving means, and an angularly disposed diverter extending over said pathway and having an article deflecting surface adapted to deflect articles moving along said pathway onto said transverse carrier to be carried onto said receiving means, drive means for said vehicle, and control means on said vehicle for actuating said drive means and intermittently moving said vehicle parallel to said receiving means in response to the passage of said articles whereby said articles are placed in longitudinally spaced relationship on said receiving means, said control means including starter means sensitive to the arrival of an article adjacent said transverse carrier to actuate said drive means and timer means responsive to said starter means to deactuate said drive means.

3. Article distributing means comprising an elongate pathway, an elongate receiving means in parallel spaced relationship with at least a portion of said pathway, drive means for moving articles along said pathway, and diverter means intermediate said pathway and said receiver means and movable longitudinally therebetween for diverting articles from said pathway onto said receiving means at predetermined, spaced intervals along the length of said receiving means, said diverter means comprising a wheeled vehicle disposed between said pathway and said receiving means and adapted for longitudinal movement therebetween, a transverse movable article carrier disposed on said vehicle and adapted to carry articles between said pathway and said receiving means, an angularly disposed diverter extending over said pathway and having a moving article deflecting surface to deflect articles moving along said pathway onto said moving transverse carrier to be carried to said receiving means, and control means actuated by an article approaching said diverter to move said diverter and said transverse carrier, and drive means actuated by said control means and intermittently moving said vehicle parallel to said receiving means in response to the passage of said articles whereby said articles are distributed in longitudinal spaced relationship on said receiving means.

4. Article distributing means comprising an elongate pathway, an elongate receiving means in parallel spaced relationship with at least a portion of said pathway, said receiving means comprising an angularly disposed article supporting surface sloping downwardly from said pathway, and stop means disposed along said supporting surface to retain articles thereon, drive means for moving articles along said pathway, and diverter means intermediate said pathway and said receiver means and movable longitudinally therebetween for diverting articles from said pathway onto said receiving means at predetermined, spaced intervals along the length of said receiving means, said diverter means comprising a wheeled vehicle disposed between said pathway and said receiving means and adapted for longitudinal movement therebetween, a transverse movable article carrier disposed on said vehicle and adapted to carry articles between said pathway and said receiving means, an angularly disposed diverter extending over said pathway and having a moving article deflecting surface to deflect articles moving along said pathway onto said moving transverse carrier to be carried to said receiving means, and control means actuated by an article approaching said diverter to move said diverter and said transverse carrier, and drive means actuated by said control means and intermittently moving said vehicle parallel to said receiving means in response to the passage of said articles whereby said articles are distributed in longitudinal spaced relationship on said receiving means.

5. Article distributing means comprising an elongate pathway, an elongate receiving means in parallel spaced relationship with at least a portion of said pathway, said receiving means comprising an angularly disposed article supporting surface sloping downwardly from said pathway, and stop means disposed along said supporting surface to retain articles thereon, drive means for moving articles along said pathway, said means comprising a continuously moving carrier, and diverter means intermediate said pathway and said receiver means and movable longitudinally therebetween for diverting articles from said pathway onto said receiving means at predetermined, spaced intervals along the length of said receiving means, said diverter means comprising a wheeled vehicle disposed between said pathway and said receiving means and adapted for longitudinal movement therebetween, a transverse movable article carrier disposed on said vehicle and adapted to carry articles between said pathway and said receiving means, an angularly disposed diverter extending over said pathway and having a moving article deflecting surface to deflect articles moving along said pathway onto said moving transverse carrier to be carried to said receiving means, and control means actuated by an article approaching said diverter to move said diverter and said transverse carrier, and drive means actuated by said control means and intermittently moving said vehicle parallel to said receiving means in response to the passage of said articles whereby said articles are distributed in longitudinal spaced relationship on said receiving means.

6. Article distributing means comprising an elongate pathway, an elongate receiving means in parallel spaced relationship with at least a portion of said pathway, said receiving means comprising an angularly disposed article supporting surface sloping downwardly from said pathway, and stop means disposed along said supporting surface to retain articles thereon, drive means for moving articles along said pathway, said pathway extending substantially beyond said receiving means to define an article unloading area, said drive means including a continuously moving belt to carry articles from said unloading area along said pathway to a predetermined position adjacent said receiving means, and diverter means intermediate said pathway and said receiver means and movable longitudinally therebetween for diverting articles from said pathway onto said receiving means at predetermined, spaced intervals along the length of said receiving means, said diverter means comprising a wheeled vehicle disposed between said pathway and said receiving means and adapted for longitudinal movement therebetween, a transverse movable article carrier disposed on said vehicle and adapted to carry articles between said pathway and said receiving means, an angularly disposed diverter extending over said pathway and having a moving article deflecting surface to deflect articles moving along said pathway onto said moving transverse carrier to be carried to said receiving means, and control means actuated by an article approaching said diverter to move said diverter and said transverse carrier, and drive means actuated by said control means and intermittently moving said vehicle parallel to said receiving means in response to the passage of said articles whereby said articles are distributed in longitudinal spaced relationship on said receiving means.

7. Baggage distributing means comprising an elongate conveyor extending between a baggage unloading area and a baggage distribution area, an elongate baggage receiver in parallel spaced relationship with the portion of said conveyor in said distribution area, said receiver including a baggage supporting surface sloping downwardly away from said conveyor and stop means along the lowermost longitudinal edge of said surface to position baggage thereon, and diverter means for diverting articles from said conveyor to said supporting surface comprising a wheeled vehicle disposed between said conveyor and said receiving means and adapted for longitudinal movement therebetween, a transverse conveyor disposed on said vehicle and adapted to move articles from said conveyor to said receiver, an angularly disposed diverter mounted on said vehicle extending over said conveyor and having belt means movable thereover to deflect baggage moving along said conveyor onto said transverse conveyor, baggage sensitive control means responsive to the arrival of baggage adjacent said diverter means, and drive means responsive to said control means to actuate said vehicle, said transverse conveyor and said belts for a predetermined time interval to shift said diverter means longitudinally a predetermined distance and to transfer an article of baggage to said receiver.

References Cited in the file of this patent

UNITED STATES PATENTS

| | | |
|---|---|---|
| 1,914,778 | Klyver | June 20, 1933 |
| 2,047,106 | Lidberg et al. | July 7, 1936 |
| 2,099,071 | Lundbye | Nov. 16, 1937 |
| 2,652,137 | Taranto | Sept. 15, 1953 |

FOREIGN PATENTS

| | | |
|---|---|---|
| 484,324 | Germany | Nov. 10, 1928 |